United States Patent
Nelms et al.

(10) Patent No.: US 10,368,187 B2
(45) Date of Patent: Jul. 30, 2019

(54) SYSTEMS AND METHODS FOR IDENTIFYING AVAILABLE LOCATION-BASED SERVICES

(71) Applicant: Walmart Apollo, LLC, Bentonville, AR (US)

(72) Inventors: David Martin Nelms, Rogers, AR (US); Bradley Joseph Kieffer, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/834,674

(22) Filed: Dec. 7, 2017

(65) Prior Publication Data

US 2018/0167767 A1 Jun. 14, 2018

Related U.S. Application Data

(60) Provisional application No. 62/432,339, filed on Dec. 9, 2016.

(51) Int. Cl.
| | | |
|---|---|---|
| *H04W 4/02* | (2018.01) | |
| *G06Q 20/04* | (2012.01) | |
| *G06K 7/14* | (2006.01) | |
| *G06Q 20/02* | (2012.01) | |
| *H04W 24/00* | (2009.01) | |

(52) U.S. Cl.
CPC ............... *H04W 4/02* (2013.01); *G06K 7/14* (2013.01); *G06K 7/1413* (2013.01); *G06K 7/1417* (2013.01); *G06Q 20/02* (2013.01); *G06Q 20/04* (2013.01); *G06Q 20/0453* (2013.01); *H04W 24/00* (2013.01)

(58) Field of Classification Search
CPC ...... H04W 4/02; H04W 24/00; G06K 7/1413; G06K 7/1417; G06K 7/14; G06Q 20/0453; G06Q 20/02; G06Q 20/04
USPC ...................... 455/414.1–414.2, 456.1–456.3
See application file for complete search history.

(56) References Cited

U.S. PATENT DOCUMENTS

| | | | | |
|---|---|---|---|---|
| 6,123,259 A | * | 9/2000 | Ogasawara | ........ G06K 17/0022 235/380 |
| 2002/0138345 A1 | * | 9/2002 | Dickson | ................. G06Q 30/02 705/14.36 |
| 2004/0104930 A1 | * | 6/2004 | Stoler | .................... G06Q 30/02 715/738 |

(Continued)

OTHER PUBLICATIONS

International Search Report and Written Opinion for Application No. PCT/US2017/065112, dated Feb. 23, 2018. 6 pages.

*Primary Examiner* — Michael Y Mapa
(74) *Attorney, Agent, or Firm* — McCarter & English, LLP; David R. Burns

(57) ABSTRACT

Described in detail herein are methods and systems to identify available location-based services using a mobile application on a mobile computing device. The mobile application receives a code from a location-specific computing device and uses the code to identify available types of services supported at the location of the location-specific computing device. A services management framework determines what ordered services are available at the location. A user uses the mobile computing device to scan a machine-readable element at the location to initiate performance of at least one of the available ordered services.

21 Claims, 4 Drawing Sheets

(56) References Cited

U.S. PATENT DOCUMENTS

| | | | |
|---|---|---|---|
| 2010/0262554 A1* | 10/2010 | Elliott | G01C 21/20 |
| | | | 705/323 |
| 2013/0181045 A1* | 7/2013 | Dessert | G06Q 20/322 |
| | | | 235/383 |
| 2015/0071743 A1 | 3/2015 | Lert, Jr. | |
| 2015/0079942 A1* | 3/2015 | Kostka | H04W 4/21 |
| | | | 455/411 |
| 2015/0172862 A1 | 6/2015 | Kau et al. | |
| 2016/0125505 A1* | 5/2016 | Goulart | G06Q 30/0633 |
| | | | 705/26.8 |

* cited by examiner

SYSTEMS AND METHODS FOR IDENTIFYING AVAILABLE LOCATION-BASED SERVICES

CROSS-REFERENCE TO RELATED PATENT APPLICATIONS

This application claims priority to and benefit of U.S. Provisional Patent Application No. 62/432,339, filed Dec. 9, 2016, the disclosure of which is incorporated herein by reference in its entirety.

BACKGROUND

Mobile applications executing on a mobile computing device such as a smartphone may make use of the mobile computing device's wireless communication capabilities to interact with other computing devices. For example, the mobile computing device may include wireless communication capabilities such as WiFi and Bluetooth™ that can be utilized by the mobile application.

BRIEF SUMMARY

In one embodiment, a system for performing location-based services is provided. The system includes a mobile application executable on a mobile computing device operated by a user. The system also includes a database storing one or more ordered services associated with the user. The system further includes a location-specific computing device configured to use location-based wireless communication to transmit a code to the mobile application that identifies types of services available to be performed at a location of the location-specific computing device. The system also includes a machine-readable element configured to provide location information and used in initiating performance of one or more available ordered services. The system further includes a server communicatively coupled to the database and the mobile application and hosting a services management framework configured to map the one or more ordered services to the one or more available types of services to determine one or more available ordered services at the location of the location-specific computing device. The mobile application is configured to receive a code from the location-specific computing device and to identify the one or more available types of services based on the code. The mobile application is further configured to transmit, to the services management framework, the one or more available types of services. The mobile application is also configured to decode the machine-readable element. The mobile application is further configured to initiate performance of at least one of the one or more available ordered services determined by the services management framework.

In another embodiment, a method for identifying available location-based services is provided. The method includes transmitting, via a location-specific computing device configured to use location-based wireless communication, a code to a mobile application executable on a mobile computing device operated by the user, wherein the code identifies types of services available to be performed at a location of the location-specific computing device. The method also includes receiving, via the mobile application, a code from the location-specific computing device and identifying, via the mobile application, the one or more available types of services based on the code. The method also includes transmitting, via the mobile application to a server hosting an services management framework, the one or more available types of services. The method further includes mapping, via the services management framework, one or more ordered services to the one or more available types of services to determine one or more available ordered services at the location of the location-specific computing device. Records of the one or more ordered services are previously stored in a database and associated with the user. The method also includes scanning, via the mobile application, a machine-readable element configured to provide location information used to initiate performance of the one or more available ordered services. The method further includes decoding, via the mobile application, the machine-readable element. The method also includes initiating, using the mobile application, performance of the one or more available ordered services.

BRIEF DESCRIPTION OF DRAWINGS

To assist those of skill in the art in making and using a location-based identification system and associated methods, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting. In the figures.

DETAILED DESCRIPTION

Figure 1:
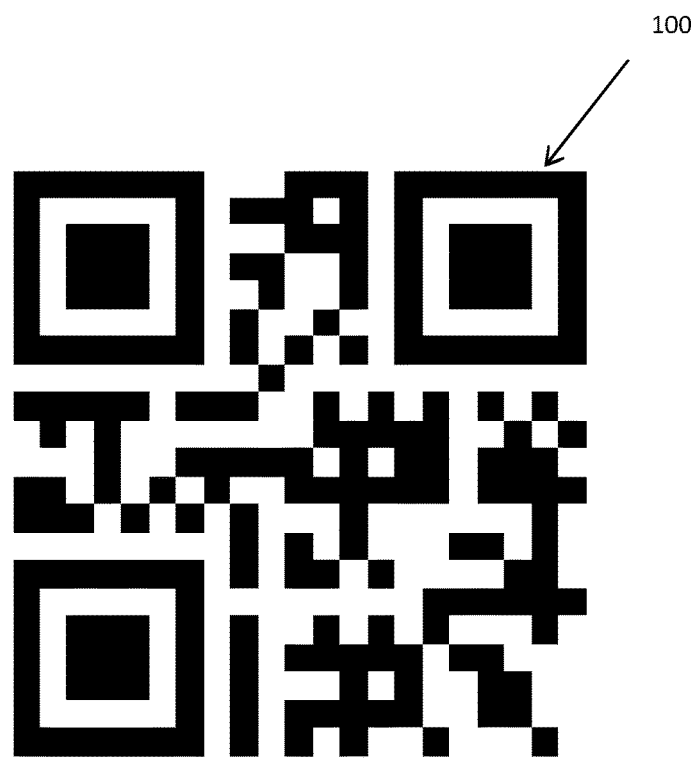
FIG. 1 is a block diagram of an exemplary machine-readable element, in accordance with an exemplary embodiment.

Described in detail herein are methods and systems for identifying available location-based services using a location-based identification system. In one embodiment, the location-based identification system may be employed in a physical facility such as a retail store. The system includes a specialized mobile application associated with a mobile computing device, such as a smartphone. The mobile application may include authentication information for a user, such as a user name or a user identification (ID) and a password. The system also includes a location-specific computing device configured to transmit a code to the mobile computing device using a wireless location-based positioning service, such as Bluetooth short range wireless connectivity. The mobile application may use the code to identify available types of services that are supported at a location of the location-specific computing device. The available types of services are location-based computerized services that can be performed at the location-based computing device using the mobile application. Non-limiting examples of the types of services include purchasing goods and services, processing a pharmacy order, financial services such as transferring or receiving money to/from a third party, receiving an electronic receipt (i.e., an e-receipt) from a purchase, and returning an item from the e-receipt.

The system also includes a server hosting an services management framework coupled in communication with a database and the mobile application. The database includes one or more services ordered by the user (hereafter referred to as "ordered services"). Ordered services are computerized services that the user would like performed in connection with their trip to a physical facility.

The mobile application transmits the available types of services identified from the code to the services management framework. The services management framework is configured to map the one or more ordered services to the available types of services to determine one or more available ordered services at the location of the location-specific computing device. Available ordered services are ordered services that are able be performed at a particular location-specific computing device, such as a point of sale (POS) terminal.

The system further includes a machine-readable element configured to provide the mobile application with location information used in initiating performance of at least one of the one or more available ordered services by transmitting user authentication data and the location information to the services management framework. In the exemplary embodiment, the machine-readable element is located at or within close proximity to the location-specific computing device equipped with a short-range communication protocol. In such an embodiment, the location information is associated with a location of the location-specific computing device. A user may then use the mobile computing device to scan the machine-readable element so that the performance of the one or more available ordered services is initiated.

A non-limiting example of the location-based identification system includes a user at a physical facility, such as a retail store, using a mobile application on a mobile computing device, such as a Bluetooth-equipped smartphone. The user previously has ordered services whether through the mobile application or online that are not complete as they require some user interaction with the facility (i.e. picking up purchases, money, returning an item, etc.). Exemplary services include without limitation purchases of goods, pharmacy orders, transferring or receiving money to/from a third party and the return of items referenced by electronic receipts. Records of these orders are saved in a database and associated with the user. At the facility, the user may approach within transmission range of a location-specific computing device equipped with a location-based wireless communication capability, such as a POS terminal equipped with a Bluetooth low energy (BLE) beacon that connects to the mobile computing device via Bluetooth pairing. The location-specific computing device transmits a code to the mobile application. The mobile application uses the code to identify what types of services are available to the mobile application in that location. The mobile application transmits the user's identity and the available types of services to a services management framework being executed on a server. The services management framework maps the available types of services to the ordered services associated with the user to determine which ordered services are available at the particular location and transmits that information to the mobile application. In other words, these are the available types of services relevant for the user's current trip. When the user scans a machine-readable element (such as a QR code) containing location information that is located at the location-specific computing device, one or more of the user's stored ordered services may be automatically processed using the mobile application. For example, if pharmacy services are available at the location an associate may be notified to pick up a previously filled prescription for delivery to the user. Alternatively, the mobile application may adjust its displayed information regarding services based on the transmission from the services management framework and query the user as to which available ordered services the user wishes to have performed. As part of the available orders being processed following the scanning of the machine-readable element, the mobile application may transmit authentication data identifying the user and the location information to the services management framework, which in turn communicates with respective modules that perform the available ordered services.

The location-based identification system may improve customer service by minimizing an individual's wait time to receive services, while also improving the ease and accuracy of performing multiple services by scanning a machine-readable element using a mobile computing device. The location-based identification system may further improve the efficiency of the computing environment by reducing network traffic by automating the authentication, payment and selection of services at a location.

FIG. 1 is a block diagram of an exemplary machine-readable element 100. In one exemplary embodiment, machine-readable element 100 is a QR code or a bar code (not shown). Machine-readable element 100 includes one or more encoded identifiers identifying a location of a location-specific computing device (shown in FIG. 2) associated with machine-readable element 100. For example, machine-readable element 100 may be physically attached to the location-specific computing device, such as a sticker of machine-readable element 100 placed at a register. In another embodiment, machine-readable element 100 may be shown on a computing display associated with the location-specific computing device.

A scanner or reader can scan and/or decode the identifiers from machine-readable element 100. In an exemplary embodiment, a camera associated with a mobile computing device (shown in FIG. 2) is used to scan machine-readable element 100. A mobile application (shown in FIG. 2) then decodes the identifier(s) in machine-readable element 100. In one embodiment, an identifier is alpha-numeric characters.

Figure 2:
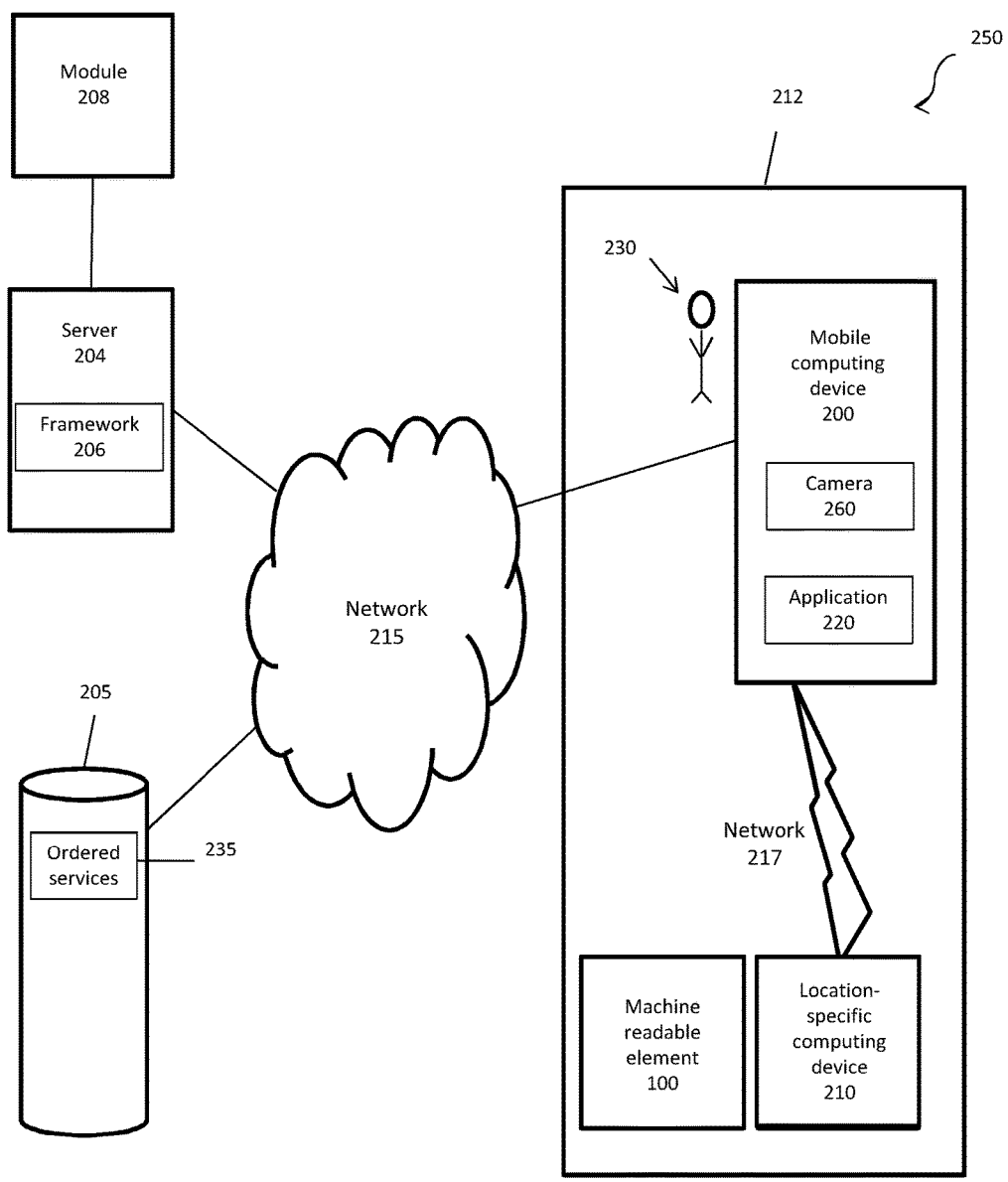
FIG. 2 illustrates an exemplary network environment suitable for a location-based identification system, in accordance with an exemplary embodiment.

FIG. 2 illustrates an exemplary network environment suitable for a location-based identification system 250, in accordance with an exemplary embodiment. Location-based identification system 250 includes one or more databases 205 (only one shown in FIG. 2), one or more mobile computing devices 200 (only one shown in FIG. 2), one or more location-specific computing devices 210 (only one shown in FIG. 2), one or more machine-readable elements 100 (only one shown in FIG. 2), and one or more servers 204 (only one shown in FIG. 2) hosting an services management framework 206. Mobile computing device 200 includes a mobile application 220 configured to communicate with location-specific computing device 210 via a network 217. In the exemplary embodiment, network 217 is a wireless network for exchanging data over short distances, such as using Bluetooth short range wireless connectivity. In an alternative embodiment, network 217 is a wireless network for exchanging data over longer but still limited distances, such as by using Wi-Fi connectivity. Mobile computing device 200 may also include a camera 260 used to scan machine-readable element 100. Mobile application 220 may include instructions associated with decoding identifiers encoded in machine-readable element 100.

As a non-limiting example, location-based identification system 250 is associated with a physical facility 212. In the exemplary embodiment, user 230, mobile computing device 200, at least one location-specific computing device 210, and at least one machine-readable element 100 are located within physical facility 212. User 230 uses mobile computing device 200. A location of mobile computing device 200 is determined using location-specific computing device 210 and wireless communications network 217, as described below.

In one embodiment, location-specific computing device 210 is located within, attached to, or in close proximity to a POS terminal. In such an embodiment, wireless communications network 217 is a short range communication network, such as Bluetooth. Location-specific computing device 210 uses wireless communications network 217 to communicate with mobile computing device 200 when within signal range. For example, in one embodiment, location-specific computing device 210 includes a Bluetooth low energy (BLE) beacon that transmits a Bluetooth signal to mobile computing device 200. It should be appreciated that a separate Bluetooth equipped device in communication with, and close proximity to, a computing device could also be employed without departing from the scope of the present invention.

In an alternative embodiment, location-specific computing device 210 uses wireless communications network 217 to communicate with mobile computing device 200 through a Wi-Fi signal. For example, in one embodiment, location-specific computing device 210 transmits a Wi-Fi signal throughout the physical facility 212 and determines a location of mobile computing device 200 using a Wi-Fi positioning system (e.g., Wi-Fi positioning triangulation using a plurality of location-specific computing devices 210, RSSI-based localization, etc.).

When mobile computing device 200 enters a specified location, such as in proximity to location-specific computing device 210, location-specific computing device 210 transmits a code to mobile application 220 using network 217. Mobile application 220 uses the code to identify types of services available to mobile application 220 at the location of location-specific computing device 210.

Mobile application 220 is further configured to communicate with services management framework 206 via a communications network 215. In the exemplary embodiment, one or more portions of communications network 215 is an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In the exemplary embodiment, services management framework 206 is further in communication with database 205 and one or more modules 208 (only one shown in FIG. 2) configured to perform services. Database 205 includes one or more ordered services 235 for user 230. Each ordered service 235 is previously defined by user 230 using a computing device and is associated with a user identification (ID) for user 230. In some embodiments, user 230 creates the one or more ordered services 235 using the mobile application 220.

Mobile application 220 transmits the available types of services (identified through receipt of the code) to services management framework 206 along with the user ID for user 230. Services management framework 206 is configured to retrieve from database 205 the one or more ordered services 235 for user 230 using the user ID. Services management framework 206 is further configured to map the one or more ordered services to the available types of services to determine one or more available ordered services at a location of mobile computing device 200. In some embodiments, mobile application 220 receives the determined one or more available ordered services from services management framework 206. Mobile application 220 may then display the one or more available ordered services to user 230. In further embodiments, user 230 selects from mobile application 220 the one or more available ordered services that user 230 wants performed.

User 230 then uses mobile computing device 200 to scan machine-readable element 100 associated with location-specific computing device 210 to initiate performance of the one or more available ordered services, as described below. Machine-readable element 100 includes encoded identifiers containing location information. Mobile application 220 decodes the identifiers in response to mobile computing device 200 scanning machine-readable element 100.

Upon decoding the identifiers in machine-readable element 100, mobile application 220 transmits data to services management framework 206 directly and/or through location-specific computing device 210 to initiate performance of the one or more available ordered services. For example, the mobile application may transmit the customer identity and location to the services management framework 206 to trigger performance of the previously ordered services that are available at the particular location. Upon receipt of the location and user identity, services management framework 206 then transmits user authentication information and location information (e.g., location information for the location-specific computing device) to the appropriate modules 208 for performing the available ordered services. For example, these services may include purchasing goods and services, pharmacy services, e-receipt services, money transfer services and payments related thereto. In one embodiment, services management framework 206 may communicate with a money transfer module for transferring money to a third party, for example, using a money transfer service such as Western Union.

Database 205 is connected to communications network 215 via a wired or wireless connection. Mobile computing device 200 includes one or more processors configured to communicate with location-specific computing device 202 via network 217 and services management framework 206 via network 215. Mobile computing device 200 hosts mobile application 220 configured to interact with one or more components of services management framework 206 and location-specific computing device 210. Database 205 stores information and data related to ordered services as described herein. Database 205 can be located at one or more geographically distributed locations from other databases 205 or from services management framework 206. Alternatively, database 205 can be included within services management framework 206.

In response to scanning machine-readable element 100, the location-based identification system can process multiple transactions and services at the location-specific computing device 210. Mobile application 220 may initiate the multiple transactions and services without the need to interface with multiple computing systems, thus improving the efficiency of the computing environment. By avoiding the need to use multiple computer systems, the location-based identification system reduces network communication and increases the response speed of both the network and the available services (i.e., types of services) provided by a merchant. Reducing or eliminating transaction time improves the efficiency of the computing environment by reducing network traffic and increasing the response speed of the network.

Figure 3:
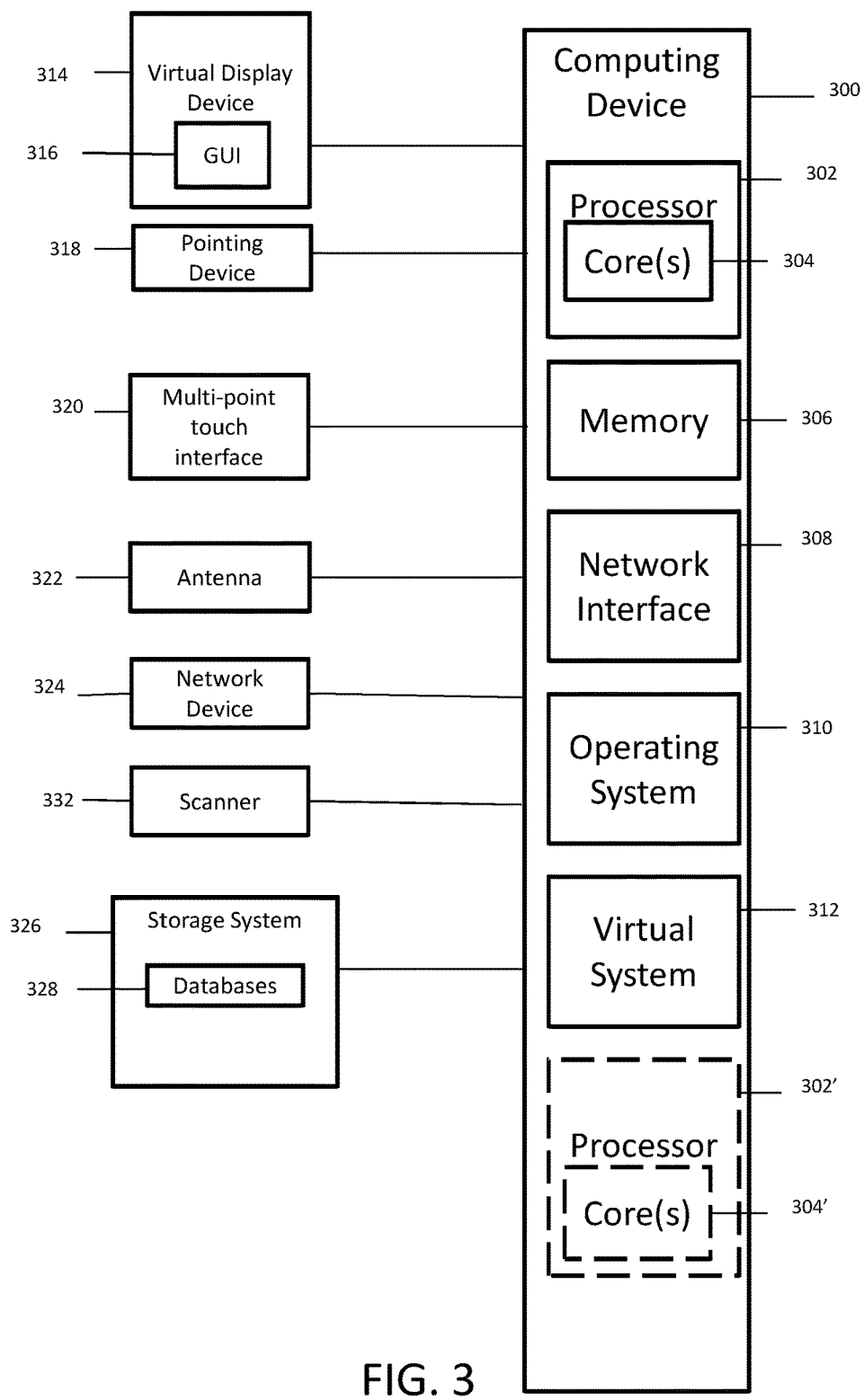
FIG. 3 is a block diagram of an exemplary computing device suitable for use in an embodiment t.

FIG. 3 is a block diagram of an example computing device 300 for implementing an exemplary embodiment. Computing device 300 may be a mobile computing device (e.g. mobile computing device 200 as shown in FIG. 2), a location-specific computing device (e.g. location-specific computing device 210 shown in FIG. 2) and/or server (e.g. server 204 shown in FIG. 2). Computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in computing device 300 may store computer-readable and computer-executable instructions or software (e.g., mobile application 220) for implementing exemplary operations of computing device 300. Computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

In some embodiments, virtualization may be employed in computing device 300 so that infrastructure and resources in computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with computing device 300 through a visual display device 314, such as a computer monitor or a touch screen display, which may display one or more graphical user interfaces 316, multi touch interface 320, a scanner 332, and a pointing device 318.

Computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 may include one or more databases 328 for storing instructions. Databases 328 may be updated manually or automatically at any suitable time to add, delete, and/or update one or more data items in the databases. Databases 328 include information such as ordered services database 235. Ordered services database 235 stores information associated with ordered services created by or for one or more users (e.g. user 230 shown in FIG. 2).

Computing device 300 includes a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the location-based identification system may include one or more antennas 322 to facilitate wireless communication (e.g., via the network interface) between computing device 300 and a network and/or between computing device 300 and other computing devices. Network interface 308 may include a built-in network adapter, network interface card, PCMCIA network card, card bus network adapter, wireless network adapter, USB network adapter, modem or any other device suitable for interfacing computing device 300 to any type of network capable of communication and performing the operations described herein.

Computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on computing device 300 and performing the operations described herein. In exemplary embodiments, operating system 310 may be run in native mode or emulated mode. In an exemplary embodiment, operating system 310 may be run on one or more cloud machine instances.

Figure 4:
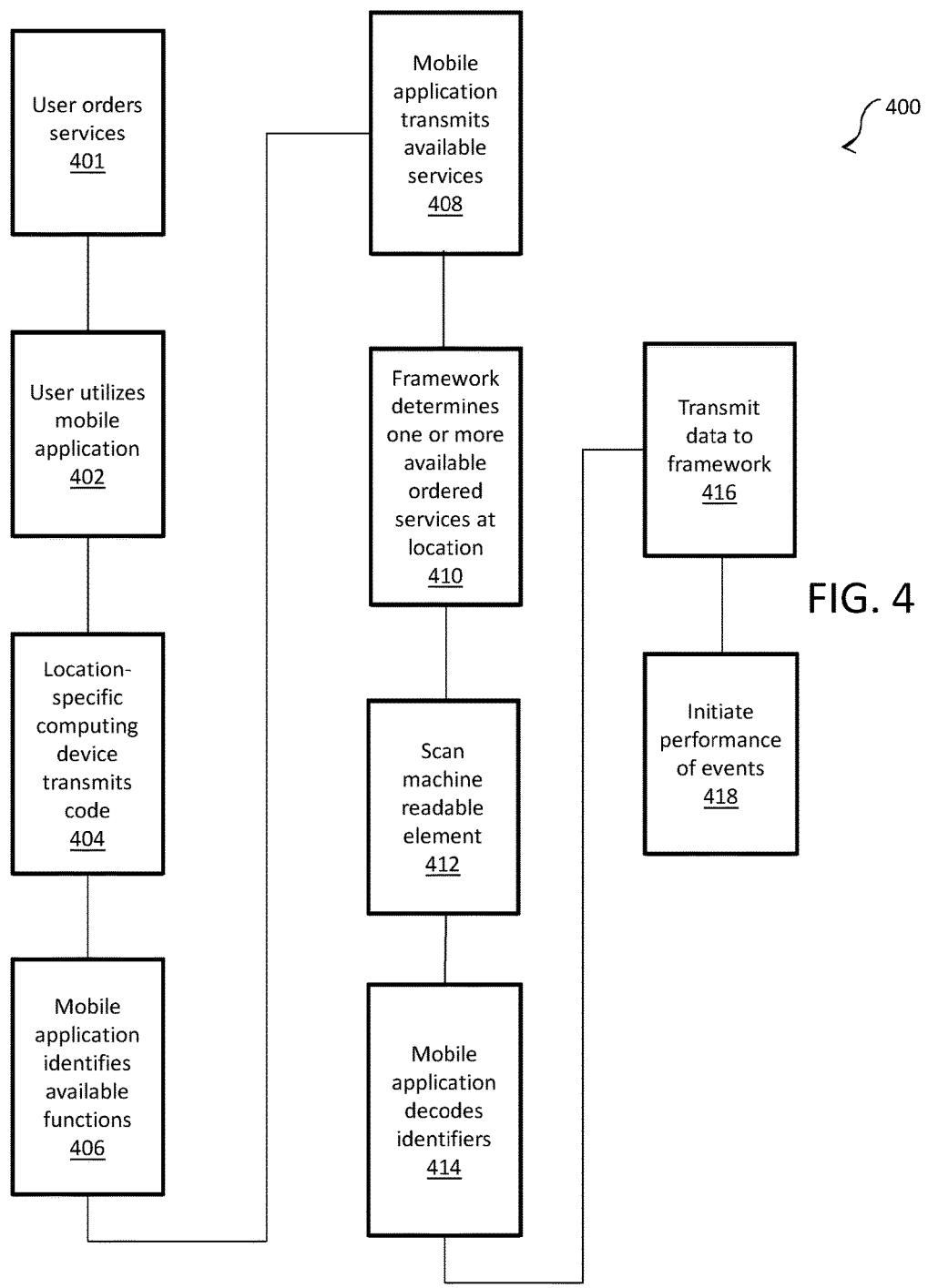
FIG. 4 illustrates a flowchart of an exemplary sequence for identifying one or more available location-based services using the location-based identification system, in accordance with an exemplary embodiment.

FIG. 4 illustrates an exemplary sequence 400 for location-based identification of available services in an exemplary embodiment. In operation 401, a user uses a computing device to create ordered services. It will be appreciated that the ordered services may also be created for the user by a third party. In operation 402, the user utilizes a specialized mobile application (e.g. mobile application 220 as shown in FIG. 2) on a mobile computing device (e.g. mobile computing device 200 as shown in FIG. 2) near a location-specific computing device (e.g. location-specific computing device 210 as shown in FIG. 2) in a store (e.g. store 212 as shown in FIG. 2). In operation 404, a location-specific computing device (e.g. location-specific computing device 210 as shown in FIG. 2) transmits a code to the mobile application. In one embodiment, the location-specific computing device is a computing device equipped with a Bluetooth low energy (BLE) beacon. In operation 406, the mobile application uses the code to identify available types of services that are supported at the location of the location-specific computing device. In operation 408, the mobile application transmits the available types of services to a services management framework (e.g. services management framework 206 as shown in FIG. 2). In operation 410, the services management framework 206 maps one or more ordered services to the available types of services to determine one or more available ordered services at the location of the location-specific computing device.

In operation 412, the mobile computing device scans a machine-readable element (e.g. machine-readable element 100 as shown in FIG. 2). In the exemplary embodiment, the machine-readable element is located at or near a location-specific computing device. In operation 414, the mobile application decodes identifiers in the machine-readable element. In an exemplary embodiment, at least one identifier provides information on the location-specific computing device, such as location information. In operation 416, the mobile application transmits data to the services management framework. The data may include user authentication information, purchase information, and location information. In operation 418, the services management framework initiates performance of the one or more available ordered services by communicating with the appropriate modules.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, types of services and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

We claim:

1. A system for identifying available location-based services, the system comprising:
   a mobile application executable on a mobile computing device operated by a user;
   a database storing one or more previously ordered services associated with the user, wherein the one or more previously ordered services are pending services that are not yet complete due to the services requiring an interaction of the user with a physical facility;
   a plurality of location-specific computing devices located at a plurality of locations within a facility that are configured to use location-based wireless communication to transmit a code to the mobile application that identifies types of services available to be performed at a location of a location-specific computing device, at least one available service differing between two of the plurality of locations, wherein the available types of services are location-based services capable of being performed at a location of a location-specific computing device;
   a machine-readable element configured to provide location information used in initiating performance of one or more available ordered services; and
   a server communicatively coupled to the database and the mobile application and hosting a services management framework configured to map the one or more previously ordered services to the one or more available types of services to determine one or more available ordered services at a location of a location-specific computing device, wherein the one or more available ordered services are ordered services capable of being performed at a location of a location-specific computing device,
   wherein the mobile application is configured to:
      receive a code from a first location-specific computing device of the plurality of location-specific computing devices;
      identify one or more available types of services based on the code;
      transmit, to the services management framework, the identification of the one or more available types of services and user authentication data;
      receive an indication from the services management framework of the one or more available ordered services;
      decode the machine-readable element to decode location information; and
      initiate performance of at least one of the one or more available ordered services determined by the services management framework using the decoded location information.

2. The system of claim 1, wherein at least one of the machine-readable element and the first location-specific computing device are associated with a point of sales terminal.

3. The system of claim 1, wherein the location-based wireless communication is performed using Bluetooth or Wi-Fi.

4. The system of claim 1, wherein the one or more available types of services includes at least one of purchasing goods and services, using the store payment option to pay for a pharmacy order, transferring money to a third party, receiving money from a third party, receiving an e-receipt from a purchase, and returning an item from the e-receipt.

5. The system of claim 1, wherein the machine-readable element is a QR code or a bar code.

6. The system of claim 1, wherein the services management framework is further configured to transmit to the mobile computing device a notification regarding the one or more available ordered services determined by the services management framework, wherein the mobile application displays a query regarding the one or more available ordered services to a user.

7. The system of claim 1, wherein the mobile application is further configured to transmit to the services management framework at least one of user identification data, location data, and purchase data.

8. A method for identifying available location-based services, the method comprising:
   transmitting, via a first location-specific computing device of a plurality of location-specific computing devices located at a plurality of locations within a facility, a code to a mobile application executable on a mobile computing device operated by a user, wherein the code identifies types of services available to be performed at a location of the first location-specific computing device, wherein the available types of services are location-based services capable of being performed at the location of the first location-specific computing device, and wherein at least one available service differs between the location of the first location-specific computing device and a location of a second location-specific computing device;

receiving, via the mobile application, the code from the first location-specific computing device;

identifying, via the mobile application, one or more available types of services based on the code;

transmitting, via the mobile application, the identification of the one or more available types of services and user authentication data to a server hosting a services management framework;

mapping, via the services management framework, one or more previously ordered services to the one or more available types of services to determine one or more available ordered services at the location of the first location-specific computing device, wherein the one or more previously ordered services are pending services that are not yet complete due to the services requiring an interaction of the user with a physical facility, and the one or more available ordered services are ordered services capable of being performed at the location of the first location-specific computing device;

receiving, via the mobile application, an indication from the services management framework of the one or more available ordered services;

receiving a scan, via the mobile application, taken by the mobile computing device, of a machine-readable element configured to provide location information used in initiating performance of the one or more available ordered services;

decoding, via the mobile application, the machine-readable element to decode location information; and initiating, using the mobile application, performance of the one or more available ordered services using the decoded location information.

9. The method of claim 8, wherein at least one of the machine-readable element and the first location-specific computing device are associated with a point of sales terminal.

10. The method of claim 8, wherein the location-based wireless communication is performed using Bluetooth or Wi-Fi.

11. The method of claim 8, wherein the one or more available types of services includes at least purchasing goods and services, using the store payment option to pay for a pharmacy order, transferring money to a third party, receiving money from a third party, receiving an e-receipt from a purchase, and returning an item from the e-receipt.

12. The method of claim 8, wherein the machine-readable element is a QR code or a barcode.

13. The method of claim 8, further comprising transmitting, by the services management framework to the mobile computing device, a notification regarding the one or more available ordered services determined by the services management framework, wherein the mobile application displays a query regarding the one or more available ordered services to the user.

14. The method of claim 8, further comprising transmitting, by the mobile application to the services management framework, at least one of user identification data, location data, and purchase data.

15. At least one non-transitory computer readable medium storing instructions to cause a processor to implement a method for identifying available location-based services, the method comprising:

storing, in a database, one or more previously ordered services associated with a user wherein the one or more previously ordered services are pending services that are not yet complete due to the services requiring an interaction of the user with a physical facility;

transmitting, via a first location-specific computing device of a plurality of location-specific computing devices located at a plurality of locations within a facility, a code to a mobile application executable on a mobile computing device operated by the user, wherein the code identifies types of services available to be performed at a location of the first location-specific computing device, wherein the available types of services are location-based services capable of being performed at the location of the first location-specific computing device, and wherein at least one available service differs between the location of the first location-specific computing device and a location of a second location-specific computing device;

receiving, via the mobile application, the code from the first location-specific computing device;

identifying, via the mobile application, one or more available types of services based on the code;

transmitting, via the mobile application, the identification of the one or more available types of services and user authentication data to a server hosting a services management framework;

mapping, via the services management framework, the one or more previously ordered services to the one or more available types of services to determine one or more available ordered services at the location of the first location-specific computing device, wherein the one or more available ordered services are ordered services capable of being performed at the location of the first location-specific computing device;

receiving, via the mobile application, an indication from the services management framework of the one or more available ordered services;

receiving a scan, via the mobile application, taken by the mobile computing device, of a machine-readable element configured to provide location information used in initiating performance of one or more available ordered services;

decoding, via the mobile application, the machine-readable element to decode location information; and initiating, via the mobile application, performance of the one or more available ordered services using the decoded location information.

16. The at least one non-transitory computer readable medium of claim 15, wherein at least one of the machine-readable element and the first location-specific computing device are associated with a point of sales terminal.

17. The at least one non-transitory computer readable medium of claim 15, wherein the location-based wireless communication is performed using Bluetooth or Wi-Fi.

18. The at least one non-transitory computer readable medium of claim 15, wherein the one or more available types of services includes at least purchasing goods and services, using the store payment option to pay for a pharmacy order, transferring money to a third party, receiving money from a third party, receiving an e-receipt from a purchase, and returning an item from the e-receipt.

19. The at least one non-transitory computer readable medium of claim 15, wherein the machine-readable element is a QR code or a barcode.

20. The at least one non-transitory computer readable medium of claim 15, further comprising transmitting, by the services management framework to the mobile computing device, a notification regarding the one or more available ordered services determined by the services management framework, wherein the mobile application displays a query regarding the one or more available ordered services to the user.

21. The at least one non-transitory computer readable medium of claim 15, further comprising transmitting, by the mobile application to the services management framework, at least one of user identification data, location data, and purchase data.

\* \* \* \* \*

(12) INTER PARTES REVIEW CERTIFICATE (3638th)
United States Patent
Nelms et al.

(10) Number: US 10,368,187 K1
(45) Certificate Issued: Jul. 5, 2024

(54) SYSTEMS AND METHODS FOR IDENTIFYING AVAILABLE LOCATION-BASED SERVICES

(71) Applicants: David Martin Nelms; Bradley Joseph Kieffer

(72) Inventors: David Martin Nelms; Bradley Joseph Kieffer

(73) Assignee: WALMART APOLLO, LLC

Trial Number:
IPR2022-01496 filed Sep. 2, 2022

Inter Partes Review Certificate for:
Patent No.: 10,368,187
Issued: Jul. 30, 2019
Appl. No.: 15/834,674
Filed: Dec. 7, 2017

The results of IPR2022-01496 are reflected in this inter partes review certificate under 35 U.S.C. 318(b).

INTER PARTES REVIEW CERTIFICATE
U.S. Patent 10,368,187 K1
Trial No. IPR2022-01496
Certificate Issued Jul. 5, 2024

AS A RESULT OF THE INTER PARTES REVIEW PROCEEDING, IT HAS BEEN DETERMINED THAT:

Claims 1-21 are found patentable.

\* \* \* \* \*